United States Patent Office 3,388,005
Patented June 11, 1968

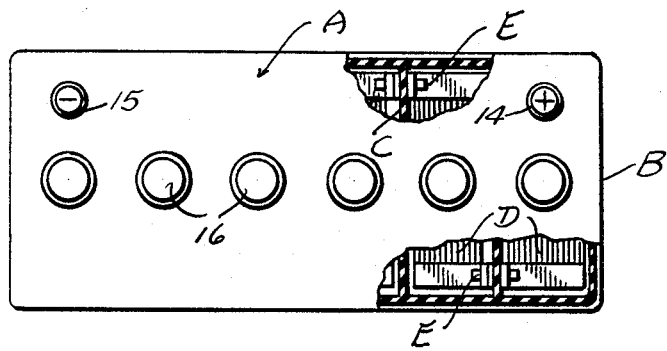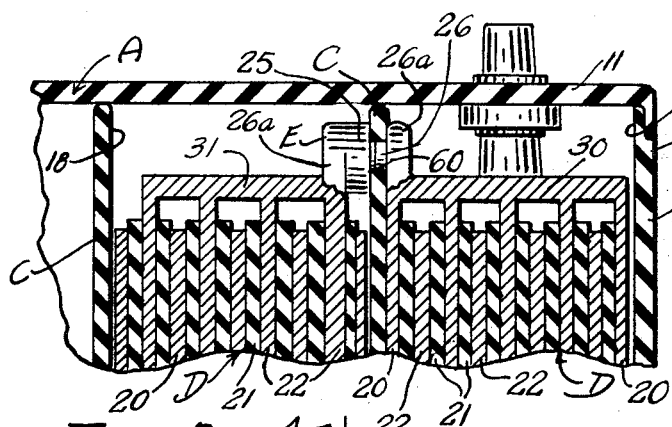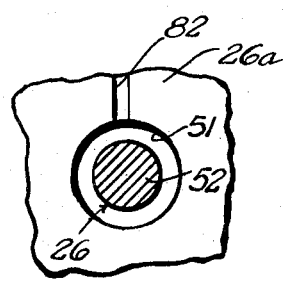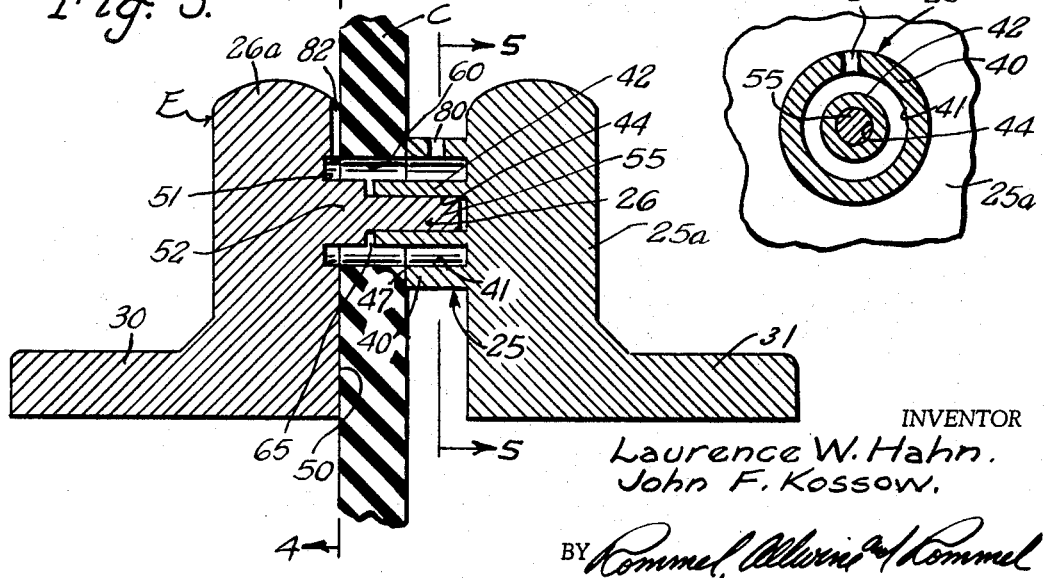
INVENTOR
Laurence W. Hahn.
John F. Kossow.

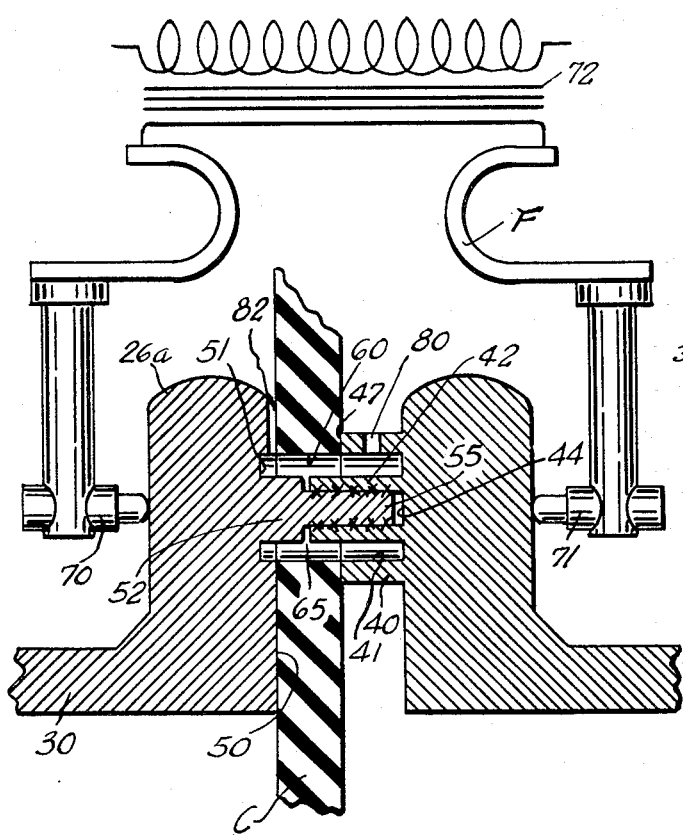
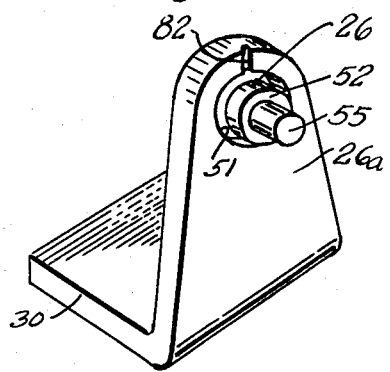
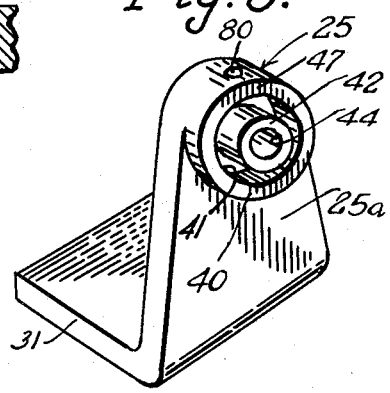
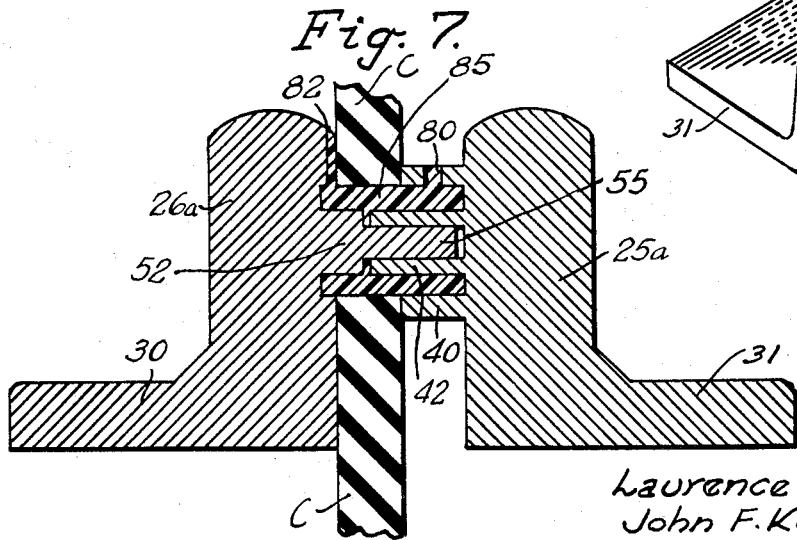

3,388,005
INTERNAL INTER-LUG CONNECTING MEANS
FOR STORAGE BATTERIES
Laurence W. Hahn and John F. Kossow, Tampa, Fla.,
assignors to Contract Battery Manufacturing Company,
Tampa, Fla., a corporation of Florida
Filed Aug. 20, 1964, Ser. No. 390,884
9 Claims. (Cl. 136—134)

ABSTRACT OF THE DISCLOSURE

An internal inter-lug connecting construction for storage batteries in which the cell element lugs are disposed completely internally in the battery casing at opposite sides of an insulation partition wall between cells and which lugs have interfitting male and female parts which are welded together in an opening of the partition wall and surrounded by a sealant which fills the opening in the partition wall.

---

This invention relates to multiple cell storage batteries. It is old in the art to provide internal connections between the cell elements of storage batteries. In many such known cases, however, the connections of the lugs through the storage battery cell partitions is not leak proof. It is therefore a purpose of the present invention to provide an absolutely fluid-tight connector at the locus of its passage through the partition wall.

A further object of this invention is the provision of interfitting means between the plate element connectors of adjacent storage battery cells with a sealant applied to the assembled interfitted parts of the connectors after complete assemblage of the connector parts to render the connection through the cell partition wall leak proof.

A further object of the invention is the provision of an improved method of connecting the plate lugs of adjacent cells of a storage battery in which interfitting male and female connector parts are provided at the locus of passage through the storage battery partition wall; the said parts being so proportioned and arranged that after assemblage of the lugs with respect to the partition a sealant may be injected to leak proof seal the parts of the lugs together and to leak proof seal the same with respect to the partition wall opening through which the connection is extended.

Other objects and advantages of this invention will be apparent during the course of the following detailed description.

In the accompanying drawings, forming a part of this specification and wherein similar reference characters designate corresponding parts throughout the several views:

FIGURE 1 is a fragmentary plan view of a storage battery having the improved lug connecting means of this invention assembled therewith and showing in cut away portions the internal lug connections.

FIGURE 2 is a fragmentary cross sectional view of the assembled connector of the elements in two adjacent cells.

FIGURE 3 is an enlarged cross sectional view showing the application of lugs and their connected parts upon a cell partition, and more particularly illustrating certain voids in which a sealant is later applied to effect a leakproof seal of the lugs and connections upon the battery partition.

FIGURE 4 is a fragmentary cross sectional view taken substantially on the line 4—4 of FIG. 3 through one of the connector lug parts.

FIGURE 5 is a cross sectional view taken substantially on the line 5—5 of FIG. 3, showing the connector parts at the opposite side of the partition wall with respect to FIG. 4.

FIGURE 6 is a fragmentary cross sectional view, partly diagrammatic, showing the manner in which the interfitting connector parts of the lugs are welded together.

FIGURE 7 is a fragmentary cross sectional view showing the details of FIG. 3 with a sealant which has been injected to fill the voids in the connector parts.

FIGURE 8 is a perspective view of an inter-cell male lug connector for negative plate plurality.

FIGURE 9 is a perspective view of an inter-cell female lug connector for positive plate plurality.

In the drawings, wherein for the purpose of illustration is shown only a preferred embodiment of the invention, the letter A may generally designate a storage battery. It comprises an insulation casing structure B of any preferred type having insulation partition walls C therein dividing the same into cell compartments which are adapted to receive battery elements D. The improved internal inter-cell lug connector E is adapted to conductively connect the positive and negative plate elements D of adjacent cells.

The casing B consists of a body portion 10 having a cover 11 normally sealed on the body 10 after assemblage of the parts, so that only the parts which project from the cover 11 are the positive and negative terminals 14 and 15 and upon which filler caps 16 may also be provided. The partitions C are of any approved insulation material well known in the art and may divide the casing body 10 into a plurality of cell compartments, such as 17 and 18, of any desired number.

The elements D may be arranged as shown in FIG. 2 in cells 17 and 18, having negative plates 20 separated by insulation partitions 21 from positive plates 22.

It will be noted from FIGS. 2 and 3 of the drawings that the connector E comprises an inter-cell female lug connector 25 adapted to be attached to the negative plates 20 of the cell elements D.

Referring to the lug 26ª shown in FIG. 8 the same includes a strap portion 30 which may be fused or otherwise connected to the negative plates 20 as shown in FIG. 2. The lug 25ª of FIG. 9 has a strap 31 which is fused to positive plates 22.

Referring in detail to the interfitting connections of the lugs 25ª and 26ª, the female connector part 25 for attachment to the positive plate group on its lug 25ª is provided with a cup shaped annulus 40 defining a passageway therein. Within the passageway 41 and coaxial with the cup-shaped portion 40 is a longer tubular portion 42 which is provided with a socket 44 therein. It will be noted from FIG. 3 that the tubular portion 42 at its outer end projects appreciably beyond the outer face 47 of the cup-shaped portion 40. Referring now to the connector portions on the negative plate lug 26ª the battery cell partition plate contacting face 50 of the lug 26ª is provided with an annular recess 51 of ring shape formation from the bottom of which projects a male extension 52. The external diameter of the recess 51 is of the same internal diameter as the recess or passageway 41 above described. The extension 52 at the inner portion is of about the same external diameter as the tubular sleeve portion 42 and at its outer end it is reduced at 55 in coaxial extension with the larger portion 52.

The partition C is provided with a transverse passageway 60 of the same diameter as the diameters of the internal recess 51 and the passageway 41. In the assemblage of the lugs the male portion 52 extends through the opening 60 of the partition and the portion 55 slidably and snugly seats in the passageway 44 of the tubular portion 42. The face 47 of the lug annulus 40 abuts one side of the partition C and lug face 50 of lug 26ᵃ abuts the other side of the partition. When the face 57 of the portion 40 abuts the side of the partition C and the lug annulus at 47 abuts the other side of the partition there will be an annular space 65 between the facing edges of the larger part 52 of the male projections of lug 26ᵃ and the outer edge of the sleeve 42; thus enabling tight fitting of the lug parts of the connectors against the partition C.

When the connector parts have been assembled to the point indicated in FIGS. 3 and 6, the male extension portion 55 and the tubular sleeve 42 are welded together at the X shaped locations, by means of equipment designated at F which comprises a pair of electrodes 70 and 71. Pressure is applied against the lugs 25ᵃ and 26ᵃ as shown in FIG. 6. The circuit 72 consists of a high amperage, very low voltage setup and it takes only a few seconds of time for the metal of the post and sleeve to be fused together, at the highest point of resistance to current flow.

It will be noted that the cup-shaped member or sleeve 40 is provided with a sealant inlet port 80, opening to the void recess 41. An exhaust port 82 may be provided in the face of the lug 26ᵃ communicating with the void or recess 51. There are thus three void areas, to wit, the passageway 41, the passageway 60 through the partition C, and the recess 51. These connect and when the thermosetting sealant 85 is forced through the port 80 it will fill all of these voids and the ports 80 and 82. The air exhausts through port 82 as the sealant is injected into port 80. Any suitable kind of epoxy resin may be used as a sealant. The viscosity of the resin is important. It is anticipated to add a seal curing agent to the resin. Not by way of limitation, but by way of explanation, it is anticipated that the epooxy resin will consist of two parts, by weight, "Ciba Areldite 506" resin to one part, by weight, "Arco Seal Curing Agent 2–40B." The epoxy resin will dry quite hard with some minor degree of elasticity. The time of hardening depends upon the exothermic temperature.

Various changes in the size, shape and arrangement of parts and in and to the steps of the method of assembling the connections may be made to the form of invention herein shown and described without departing from the spirit of the invention or scope of the claims.

We claim:

1. In an internal inter-lug connector means for storage batteries the combination with an insulation partition wall having an opening therethrough, and battery element connectors of conductive material disposed at opposite sides of the wall, one of said connectors having a male projecting part extending through the opening of the partition wall, and the other connector providing a socketed extension having the male extension disposed therein, said projecting part and extension being spaced on their outer surfaces from the inner surface of the opening of the partition, and a leak proof sealant surrounding said extensions and packed in said partition opening surrounding them.

2. The inter-lug connective means as defined in claim 1 in which the male projecting part and the socketed extension are welded together.

3. The internal inter-lug connector means for storage batteries as defined in claim 1 in which the battery connector having the projecting part is provided with an externally opened passage leading into said projecting part and the other connector has a cup shaped extension surrounding the socketed extension in spaced relation thereto with an externally opened passageway opening to the exterior surface of said socket extension, and a leak proof sealant disposed in said passageways and surrounding said projecting part and said socketed extension and disposed in leak proofing relation within the opening of said partition wall.

4. In an internal inter-cell connector for storage batteries the combination with a partition wall of insulation material having a transverse opening therethrough, and connector lugs of conductive material each including a body portion located at opposite sides of the partition wall, one of said lugs having an annular cup-shaped flange defining a void therein of a transverse width the same as said opening through the partition and communicating therewith, the cup-shaped flange engaging a side of the partition wall, said body with the flange having a fixed tubular extension beyond the body portion within said flange and projecting appreciably beyond the outer edge of said annular flange, said extension having a socket opening therein, the other lug having its body portion provided with a face adapted to engage the opposite side of the partition wall and having an annular recess therein communicating with the passageway through said partition, said second lug having a projection extending from its recess extending into the opening of the partition in spaced relation from the inner walls thereof which is seated in the socket of the tubular extension of the first described lug, and a sealant disposed in the annular flange and outer confines of the opening of the partition and in the annular recess aforesaid and surrounding said tubular extension.

5. The connector described in claim 4 in which the tubular extension of the first described lug is fused with the extension of the second described lug.

6. In an internal inter-cell conductive connector for storage batteries the combination with an insulation cell partition wall having a transverse opening therein, lug connectors at opposite sides of said wall, one of which is provided with an annular flange provided with a void therein opening into the passageway of said partition, said lug also having a coaxial tubular extension thereon extending through the annular flange void and projecting outwardly beyond the outer face of the flange and into a portion of the passageway through said partition wall, the other lug being provided with an annular recess in its wall facing the partition and communicating with said partition opening, said last mentioned lug having a male extension projecting through said recess and into the opening of the partition wall and having a reduced extension socketed in the tubular extension of the first mentioned lug and fused therewith, and a sealant in the voids of the annular flange, the opening of the partition surrounding said inter-connected lug parts and in the annular recess of the second mentioned lug to connect said lugs in leak proof relation upon and within said partition.

7. In an internal inter-cell connector for storage batteries the combination with an insulation partition wall having a transverse passageway therethrough, a pair of lugs one at each side of the partition wall, said lugs having interfitting male and female parts thereon extending through said opening in spaced relation with the inner walls of said opening, and said lugs having voids surrounding said interfitting connection communicating with the opening of the partition, and a synthetic resin sealant disposed in said voids and leak proof connecting the partition with said lug interfitting connections.

8. The internal inter-lug connector for storage batteries as defined in claim 7 in which the lug interfitting male and female parts are welded together.

9. In an internal inter-cell connector for storage batteries the combination of a closed casing having an insulation partition therein dividing the closed casing into cells at opposite sides thereof, said partition having a transverse opening therein within the closed casing, battery elements in the cells including conductive connectors in the respective cells having interconnected relatively fused members extending into said opening and spaced from the walls of said opening, said connectors having annular recesses at each side of the partition opening communicating with and closing said opening, and a leak proof sealant disposed in said opening and in said annular recesses and filling said recesses and opening and surrounding said fused members.

References Cited
UNITED STATES PATENTS

| | | | |
|---|---|---|---|
| 1,194,688 | 8/1916 | Willard | 136—168.1 |
| 1,377,995 | 5/1921 | Willard | 136—168.1 |
| 1,673,463 | 6/1928 | MacKenzie | 136—168.1 |
| 2,221,542 | 11/1940 | Hopkins. | |
| 2,942,059 | 6/1960 | Doyle et al. | 136—176 |
| 2,717,943 | 9/1955 | Daily et al. | 339—214 XR |
| 3,313,658 | 4/1967 | Sabatino et al. | 136—134 |

WINSTON A. DOUGLAS, *Primary Examiner.*

ALLEN B. CURTIS, *Examiner.*

D. L. WALTON, *Assistant Examiner.*